W. O. SNELLING.
PHOTOCHEMICAL PROCESS.
APPLICATION FILED MAR. 6, 1917.
1,420,346.
Patented June 20, 1922.
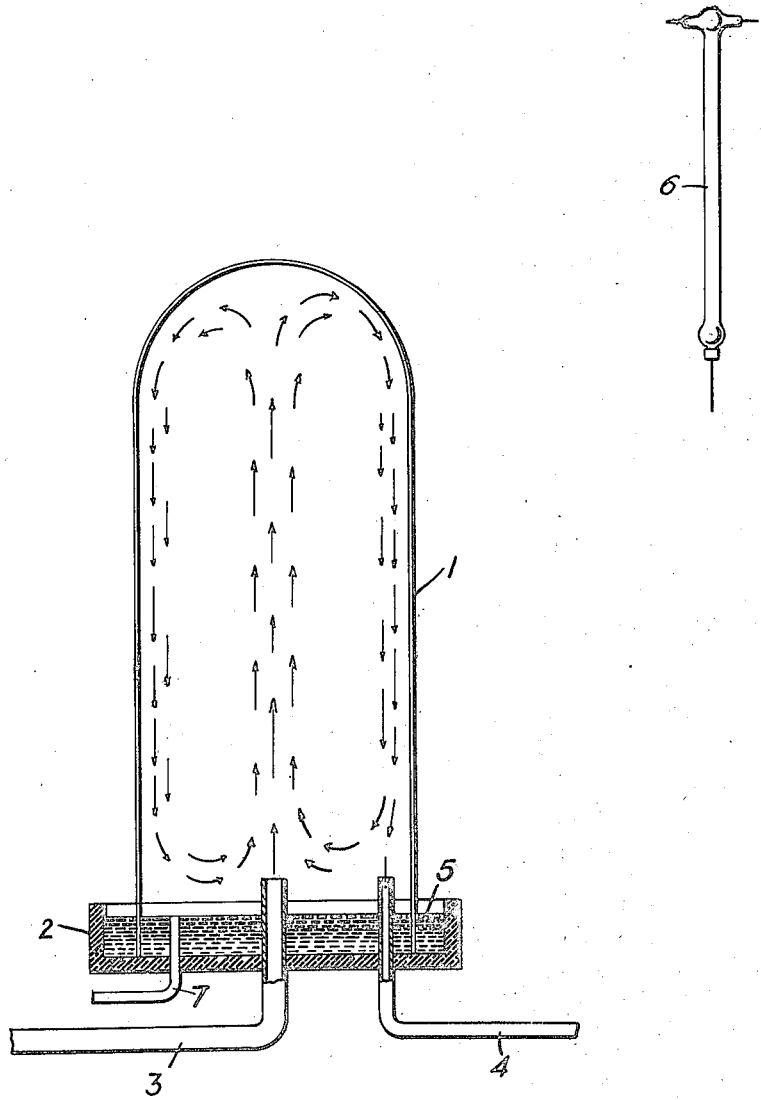
WITNESSES:
INVENTOR
Walter O. Snelling
BY
Robson De S. Brown
ATTORNEY

UNITED STATES PATENT OFFICE.

WALTER O. SNELLING, OF ALLENTOWN, PENNSYLVANIA.

PHOTOCHEMICAL PROCESS.

1,420,346.  Specification of Letters Patent.  Patented June 20, 1922.

Application filed March 6, 1917. Serial No. 152,589.

*To all whom it may concern:*

Be it known that I, WALTER O. SNELLING, a citizen of the United States, and a resident of Allentown, in the county of Lehigh and State of Pennsylvania, have invented a new and useful Improvement in Photochemical Processes, of which the following is a specification.

My invention relates to chemical reactions which involve the exposure of mixtures of liquid or gaseous reagents to actinic light for the purpose of inducing or facilitating their interaction, and it is my object to provide a simple and rapid process for performing such reactions in an economical manner and upon a commercial scale. One specific object of my invention is to prepare halogenated carbon compounds by photochemical reaction between hydrocarbons and halogens, and, in particular, to continuously produce carbon tetrachlorid, chloroform, methylene chlorid and other chlorine substitution products of methane and other hydrocarbons with which chlorine forms mixtures that tend to react with explosive violence under the influence of actinic light.

The single figure of the accompanying drawing is a central vertical sectional view of a reaction cell suitable for carrying out the process of my present invention.

In view of the highly explosive nature of gas mixtures composed of halogens, particularly chlorine, and halogen-combining substances such as hydrogen, methane and other hydrocarbons of the methane series, it has heretofore been thought necessary, in bringing about direct combination of such substances, to take precautions against explosion by exposing the reaction mixture to diffused light only, or by making use of reaction vessels in the form of slender tubes an inch or less in diameter and thereby conducting away the heat developed in the reaction fast enough to prevent the reaction mixture from becoming heated to the ignition point. If diffused light is employed, the reaction proceeds very slowly, while the forms of apparatus in which slender tubes are used are of small capacity. For these reasons, it has not heretofore been found practicable to produce halogenated compounds by direct photochemical combination upon any considerable scale without making use of a very large number of small-capacity units or cells or employing special means for preventing the full rays of the light source from falling upon the reacting gases or vapors.

My present process results from the discovery that, under the conditions to be fully described below, highly explosive gas mixtures such as mixtures of chlorine and methane can be introduced into large glass vessels and exposed to intense light, even to the direct rays of the sun or of intensely actinic flaming arcs or mercury vapor lamps, without explosion and with rapid production of halogen substitution products. I obtain this result, in general, by continuously introducing the gases or vapors which I desire to combine into a reaction chamber in which currents of gas are always maintained in rapid motion, such gas currents having the effect of transferring to the walls of the container much of the heat liberated by the reaction and thereby maintaining the temparature within the reaction chamber safely below the ignition point. In one specific method of carrying out my process, I introduce the reaction mixture from below into a dome-shaped transparent vessel exposed directly to a source of actinic light. Each portion of gas, as it enters the vessel and is exposed to the actinic rays from the external source, reacts and liberates sufficient heat to render it much lighter than the surrounding gases. The heated gas therefore rises to the top of the container and becomes cooled and denser by contact with the walls of the vessel, whereupon it sinks rapidly along the outer walls, is partly withdrawn in the form of liquid and gaseous reaction products and is partly aspirated upward by the incoming gases, such cooled and aspirated portion of the reaction products serving to still further lessen the temperature of the gases remote from the walls of the container.

For a better understanding of my invention, reference may now be had to the accompanying drawing, which shows diagrammatically the essential structural features of a reaction cell in which my process may be performed. A dome-shaped vessel 1, of glass or other transparent material, is shown resting upon a pan or tray 2, which may be constructed of stoneware or of some other material which is not attacked by the reagents present. An inlet pipe 3 is sealed through the center of the pan 2, and an outlet pipe 4 for gaseous reaction products is likewise sealed through the bottom of the pan. The outer air is excluded from the interior of the dome 1 by means of a liquid seal 5, which may suitably consist of liquid reaction products produced in the cell. One or more light sources, represented on the drawing by a mercury vapor lamp 6, are disposed adjacent to the dome 1 in order to afford the necessary actinic rays, and an outlet 7 for liquid reaction products extends through the pan 2 at any convenient point.

This form of apparatus may be started with the dome 1 completely filled with air. The lamp 6 is turned on, and the reaction mixture consisting, for example, of three parts of chlorine and one part of methane or natural gas, is introduced into the dome 1 through the inlet pipe 3 at a gradually increasing rate. If the indicated mixture of chlorine and methane is employed, and if the dome 1 is about two feet in diameter and five feet high, the gas mixture may be first introduced at the rate of about one tenth of a cubic foot per minute, this rate being gradually increased for about one hour, at the end of which time the mixed chlorine and methane may be introduced at the rate of two cubic feet per minute with complete and quiet reaction between the gases. This rate of reaction is hundreds of times faster than that which is capable of attainment with any prior form of single cell of which I am aware.

At the beginning of the foregoing operation, the large amount of air present in the dome exerts a negative catalytic effect upon the chlorine and methane and prevents initial explosions, which might otherwise occur before the normal operation is established. As more and more of the reaction mixture is introduced, the air is gradually displaced until ultimately no air is present. As the amount of air in the dome decreases, the reaction between the chlorine and methane begins, proceeding slowly at first on account of the negative catalytic effect of the air, and increasing in rapidity as the air is displaced, until finally the reaction within the dome is vigorous and complete. Much heat is liberated, since the reactions involved are highly exothermic, but the convection currents which are set up within the dome, as indicated by the arrows on the drawing, prevent the temperature of the reacting gases from rising to the ignition point. If desired, the cooling capacity of the dome walls may be increased by directing jets of air or water downwardly upon the dome.

Another factor which contributes to the quiet operation of the illustrated form of device is the continuous presence of a considerable body of gas between the incoming gas mixture and the source of light. This gas blanket is composed of gases in various degrees of combination, the gases adjacent to the wall of the dome nearest the source of light being composed of wholly combined products, and the degree of combination decreasing toward the gas inlet. The rays from the light source are therefore consumed progressively as they pass through the dome to the gas inlet, this feature of the operation of my cell being broadly described and claimed in my copending applications for Letters Patent, Serial No. 776,834, filed July 1, 1913, and Serial No. 848,355, filed July 1, 1914.

My present process is wholly distinct from the chlorination experiments which are reported in the literature and in which mixtures of chlorine and hydrogen, methane or the like have been exposed to light in large vessels to bring about their reaction. In all of such prior experiments, the vessels have first been filled with the gas mixture and then exposed to light, with the result that explosion occurs unless the light applied is very dim. In the latter case, the chlorinating reaction proceeds at a rate which is of an order of magnitude entirely different from that which characterizes my process. The prior experiments in which dim light has been used have required eight or ten hours' exposure to the light in order to bring about complete reaction in a few liters of gas, while my process is capable of producing complete reaction in similar gas mixtures at the rate of about sixty liters per minute, or one liter per second, a rate which indicates that my reaction proceeds many thousands of times as rapidly as the reactions taking place in the prior processes in which dim light is necessarily employed.

I believe that I am the first to produce continuous and quiet reactions in explosive gas mixtures by continuously introducing such a mixture into a large reaction chamber, as opposed to a slender tube, the reaction chamber being exposed to bright light. It is therefore to be understood that my invention is not restricted to the use of any particular form of apparatus, or to the treatment of any specific mixtures of reagents, and no limitations are to be imposed upon my invention except such as are indicated in the appended claims.

I claim as my invention:

1. The process which comprises producing movement within a body of photochemically reactive fluid by heat resulting from exposing the fluid to actinic rays.

2. The process which comprises circulating a body of photochemically reactive fluid by the action of actinic rays.

3. The process which comprises circulating a body of photochemically reactive fluid adjacent to a cooling surface by the action of actinic rays.

4. The process which comprises circulating a body of photochemically reactive fluid adjacent to a cooling surface by the action of actinic rays, and continuously introducing fresh fluid.

5. The process which comprises exposing a body of photochemically reactive fluid of exothermic nature to actinic rays, and utilizing the heat of reaction to cause the fluid to move adjacent to a cooling surface.

6. The process which comprises reducing the density of a portion of a photochemically reactive fluid of exothermic nature by exposing such fluid to actinic rays until its temperature has increased, and causing such portion of photochemically reactive fluid to then displace denser fluid adjacent to a cooling surface.

7. The process which comprises continuously introducing a mixture of photochemically reactive gases or vapors into a reaction chamber exposed directly to a source of actinic rays, and maintaining the temperature within the said chamber below the ignition point of the introduced material by means of convection currents of the contents of the chamber.

8. The process which comprises continuously introducing photochemically reactive fluid into a large body of circulating fluid comprising the products of photochemical reaction contained within a reaction vessel having a wall permeable to actinic rays, illuminating the contents of such vessel, and thereby causing the products of reaction of the introduced photochemically reactive fluid to pass adjacent to a cooling surface as a result of movement of the contents of the vessel.

9. The process which comprises continuously introducing a photochemically reactive fluid into a reaction chamber exposed to actinic rays, and maintaining the temperature within the chamber below the point of ignition of the fluid by continuously circulating the fluid adjacent to a cooling surface by means of convection currents within the fluid.

In testimony whereof, I have hereunto subscribed my name this 2nd day of March 1917.

WALTER O. SNELLING.